(12) United States Patent
Scipioni

(10) Patent No.: US 8,392,275 B2
(45) Date of Patent: Mar. 5, 2013

(54) IDENTIFIER-BASED CHARGE ON DELIVERY TRANSACTION

(75) Inventor: German Scipioni, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/551,398

(22) Filed: Jul. 17, 2012

(65) Prior Publication Data

US 2012/0284191 A1    Nov. 8, 2012

Related U.S. Application Data

(63) Continuation of application No. 12/891,192, filed on Sep. 27, 2010, now Pat. No. 8,234,176.

(51) Int. Cl.
*G06Q 30/00* (2012.01)

(52) U.S. Cl. ............... 705/26.1; 705/27.1; 705/26.81; 705/39; 705/44

(58) Field of Classification Search .......... 705/26.1, 705/27.1, 39, 4, 144
See application file for complete search history.

(56) References Cited

U.S. PATENT DOCUMENTS

| 5,949,882 | A * | 9/1999 | Angelo ................... 713/185 |
| 2003/0014330 | A1 * | 1/2003 | Showghi et al. ............ 705/26 |
| 2003/0040947 | A1 * | 2/2003 | Alie et al. .................. 705/7 |
| 2004/0030607 | A1 * | 2/2004 | Gibson ...................... 705/26 |
| 2005/0082366 | A1 * | 4/2005 | Yamagami et al. ......... 235/384 |
| 2006/0004658 | A1 * | 1/2006 | Chau et al. ................. 705/40 |
| 2007/0244839 | A1 * | 10/2007 | Conley ..................... 705/413 |
| 2010/0235253 | A1 * | 9/2010 | Pinkas ....................... 705/26 |

OTHER PUBLICATIONS

"Sold to the quick clicker" (David Emery. Evening Standard. London (UK): Jul. 7, 2000.).*
"Cryptographic Information Recovery using key recovery" (Michael Smith, Paul VanOorschot, and Michael Willett. Computers and Security, 19 (2000)).*

* cited by examiner

*Primary Examiner* — Courtney Stopp
(74) *Attorney, Agent, or Firm* — Haynes and Boone, LLP

(57) ABSTRACT

Guaranteed funds from a buyer are held until a delivery to the buyer is confirmed by a payment provider. The funds are then released to the seller immediately upon confirmation. Confirmation may be accomplished by the buyer entering an identifier upon delivery or some other confirmation by the shipper, where the identifier was provided to the buyer during the transaction with the seller. In other embodiments, the identifier generated by the payment provider is provided partially to the buyer and partially to the seller. Upon receiving a match of the identifier from the buyer and seller on delivery, buyer funds are released to the seller.

21 Claims, 5 Drawing Sheets

IDENTIFIER-BASED CHARGE ON DELIVERY TRANSACTION

CROSS REFERENCE TO RELATED APPLICATION

This application is a continuation of U.S. patent application Ser. No. 12/891,192, filed Sep. 27, 2010.

BACKGROUND

1. Field of the Invention

The present invention generally relates to financial transactions and more particularly to facilitating COD transactions.

2. Related Art

With the ever-increasing popularity of the Internet and of Internet commerce, both consumers and sellers are using the Internet to facilitate financial transactions between buyers and sellers. In on-line financial transactions, consumers may use third-party payment service providers to pay for products and services through electronic communications with online merchants over electronic networks, such as the Internet. The third-party payment providers provide infra-structure, software, and services that enable member buyers and member sellers or merchants to make and receive payments. The payments may be credit card payments, electronic bank transfers, or other payment techniques offered by the third-party payment provider. One payment technique may be transferring money from an account held by the payment provider, as opposed to transferring credit from an outside credit card company or an outside financial institution or bank. Transferring money held in the payment provider account may be cheaper for a user because it avoids certain transaction fees or interest payments that may be incurred when transferring money or making a payment from an outside credit or banking institution. This method may also be preferable to a seller due to more security or different kinds of assurances for the seller who wants to make sure they are not subject to charge-backs.

One problem payment providers cannot control is the delivery of goods to the proper buyer after a transaction has been agreed upon between the buyer and seller. For example, if buyer makes a payment to the seller through the payment provider, but the buyer never receives the purchased item or receives an unacceptable item, the buyer may not have many remedies, especially if the seller or the seller's account can no longer be reached or accessed by the payment provider. A seller may also want to minimize or eliminate charge-backs from purchases and ensure they are paid entirely for the sale.

Cash or collect on delivery (COD) is one way to ensure a purchased item is received. COD, as is commonly defined, is a financial transaction where the products and/or services received are paid for at the time of actual delivery rather than in advance. Once the item is delivered, the buyer provides a form of payment to the person delivering the item, which may be a third party or the seller. The payment can be cash, check, credit card, or other type of payment.

However, there are disadvantages to the buyer, seller, and delivery company with a COD transaction. For the buyer, the buyer must have sufficient cash or an acceptable form of payment. The buyer may also need exact change, and the clerk at the receiving desk may need to have the check/money ready when the package arrives and link the delivery to the exact payment. For the seller, the payment may be fraudulent, such as a non-cashable check or a fraudulent credit card number. For the delivery company, the payment from the buyer may be lost or unacceptable to the seller, resulting in a loss to the delivery company. Another potential problem is the item being delivered to the wrong person, where the person ends up signing for and making payment for the delivery. This may be problematic for the delivery company, the seller, and the intended buyer.

Another pitfall of the current COD process is the wait time for the shipping company to collect/cash the check and for the sender to actually get the cash.

Therefore, there is a need for a way to make a financial transaction without the disadvantages associated with the above described methods.

SUMMARY

According to one embodiment, a buyer enters or selects an identifier or "shared secret" into a shipper device when the shipper delivers a purchased item to the buyer. If the identifier matches the identifier associated with the buyer and/or the transaction, then funds from the buyer are transferred to the seller, and the buyer takes possession of the purchased item. The funds remain with the buyer or shipping company, such as held by rules from a payment provider, and may be released immediately to the seller once a triggered event occurs, which can be confirmed upon entry of the shared secret or other identifier, such as a tracking number.

In one embodiment, the buyer and seller agree to a purchase of one or more items from the seller, where items may also include services. This is typically done on-line, but may also be done in person. The parties also agree on COD (cash or charge on delivery) as the method of payment. The payment may be handled or processed by a payment provider, such as PayPal, Inc. of San Jose, Calif. The buyer accesses the buyer's account on the payment provider site or through a partner site, mobile device, etc., that is linked to the payment provider and is given or enters an identifier, PIN or "shared secret" that is associated with the transaction or buyer. The identifier may be in any form that is enterable or selectable on a device by the buyer, such as a phrase, a sequence of letters, characters, and/or numbers, a phrase, a video, or a picture. The shared secret may also be a match to the recipient's driver's license, signature, or other identification of the recipient. The payment provider authorizes the payment, but does not release the funds to the seller. The funds may collect interest or other value while being held.

In another embodiment, a shared secret is not required for the funds to be released. In this embodiment, the shipper may know the buyer, such that the shipper can confirm the delivery to the correct recipient.

The seller then ships the purchased item, such as through a postal service or a private delivery service. When the item is delivered to the buyer, the buyer is asked to enter or select the identifier from the earlier purchase to release funds to the seller. In one embodiment, the buyer enters a series of letters, numbers, and/or characters into a device of the person making the delivery. In another embodiment, the buyer selects from one of several options from the device, which may include pictures, sounds, videos, phrases, etc. The buyer may be allowed to inspect the item before entry or selection of the identifier.

If the entry or selection matches what was associated with the transaction or buyer when the payment was authorized, the funds are released to the seller and delivery confirmation is made. In one embodiment, the match is determined by the delivery person on the device. In another embodiment, the match is determined by the payment provider through a transmission of the entry or selection to the payment provider for the determination.

By requiring the buyer to enter a correct identifier or requiring another sort of confirmation (such as personal knowledge of the buyer by the shipper), proper delivery can be confirmed, and payment can be confidently made to the seller without the delivery company having to worry about collecting and retaining payment from the buyer.

According to another embodiment, the buyer and seller agree to a COD transaction on a purchase where delivery is from the seller to the buyer. The purchase may be from an on-line classified ad site, such as Craigslist. As part of the agreement, a payment provider assigns an identifier, such as a reference number or code to the transaction. The buyer is given a portion of the identifier and the seller given the remaining portion of the identifier. When the seller delivers the purchase to the buyer, the buyer enters its portion of the identifier and the seller enters its portion. Both portions are transmitted to the payment provider or collected by the shipper or an intermediary company, and the results of the match sent to the payment provider. If the identifier matches, the payment provider can release the funds to the seller immediately at the point of delivery.

Thus, a shared secret can be required in some situations, but not others, depending on various factors, including the type of transaction, cost of the purchase, the type of goods, the type and location of delivery, etc. If a shared secret is required, it can be a can be a fundamentally unique and objective trigger, such as the tracking number, driver's license number, etc.

These and other features and advantages of the present invention will be more readily apparent from the detailed description of the embodiments set forth below taken in conjunction with the accompanying drawings.

Figure 1:
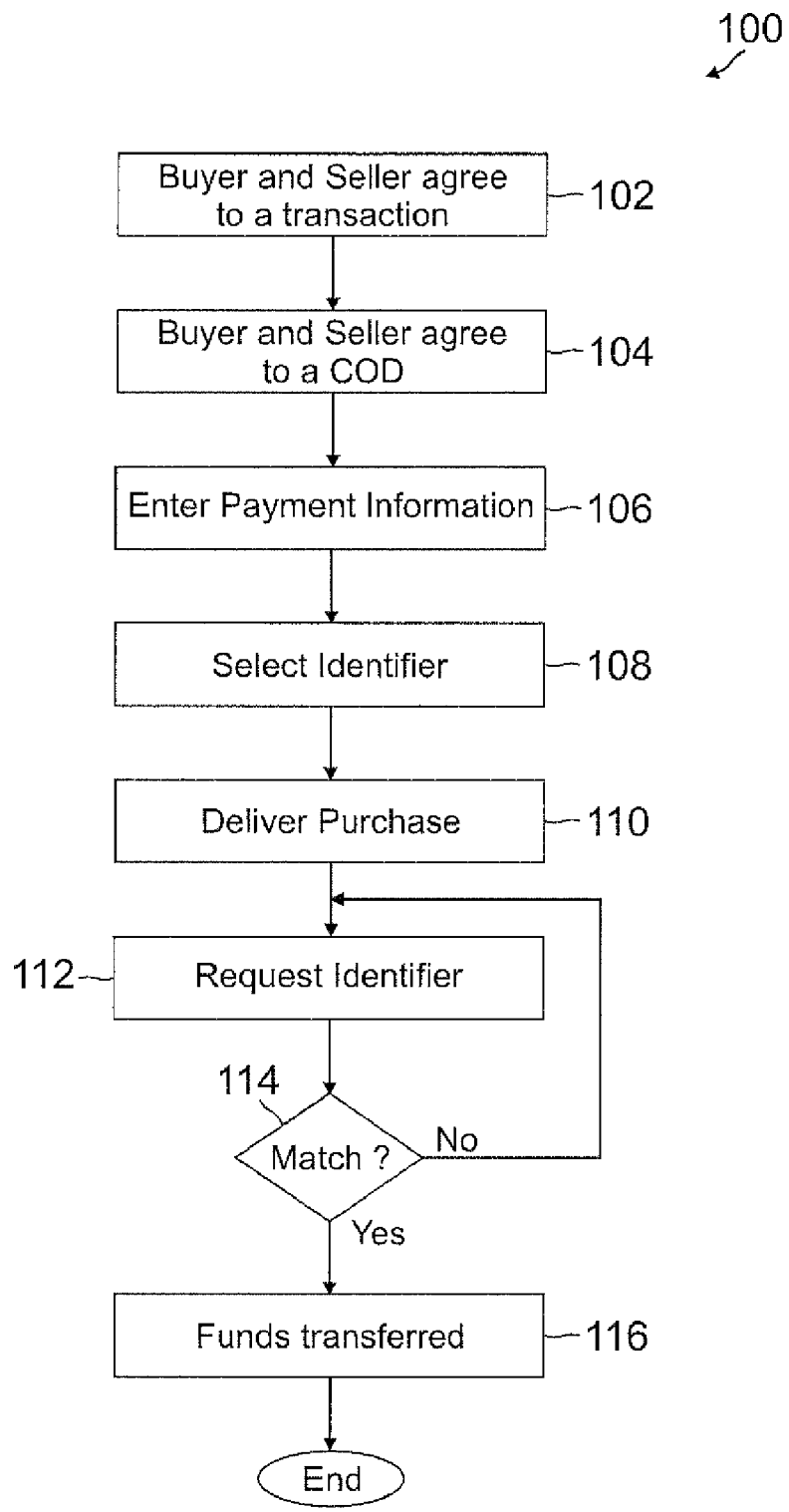
FIG. 1 is a flowchart showing steps used to facilitate an identifier-based COD transaction according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

In one embodiment of the present disclosure enable a buyer, seller, and/or delivery company to ensure a delivery of goods is to the correct buyer by requiring the buyer to enter an identifier or "shared secret" when receiving the delivery, where delivery is made and funds released to the seller only when the identifier matches what is expected. The identifier can be a PIN, phrase, image, video, sound, tracking number, reference number, etc. that is provided or known at the time of the purchase such that the identifier is associated with the transaction or buyer. The delivery company, which may be the seller, knows the identifier so that the identifier can be compared when delivery is made to the buyer. When there is a match, all parties can be confident that the delivery was to the correct recipient, and funds can be safely released to the seller. In other embodiments, the buyer and seller are given different parts of the identifier. When the seller delivers the purchase to the buyer, both parties enter their parts of the identifier, which are then transmitted to a payment provider or other entity that has knowledge of the identifier. If the received parts match to form the identifier expected of the purchase, the parties may be notified, and the payment provider releases the funds immediately to the seller, and the seller delivers the purchase to the buyer. Note that "releasing" as used herein may refer to the payment provider setting specific rules or triggers that will release funds held in the buyer's account to the seller's account. In other embodiments, a shared secret is not required. For example, if there is another means to confirm the recipient is proper, such as the shipper personally knowing the recipient or matching up an objective identifier to the recipient, such as a signature, driver's license number, or other identification.

FIG. 1 is a flowchart 100 showing one embodiment of steps used to facilitate an identifier-based COD transaction. Note that "identifier", as used herein, does not have to be a "number," but can be a phrase, image, video, sound, or any combination. In step 102, the buyer and seller agree to a transaction. The buyer may be an individual, a company, or other party desiring to obtain a purchased good or service. Note that for conciseness, a product, good, or item can also include a service or digital content and is not limited to just a tangible item. The seller may be an individual, a merchant, an on-line retailer, or other party desiring to sell a good or service. The transaction can be a purchase agreement conducted on-line or in person. For example, the buyer may locate goods on a seller site and agree to purchase the goods, such as on a classified ads site like Craigslist, a marketplace site like eBay, or a merchant site like Amazon.com. Once the goods are selected, they may be placed in a cart. Once ready for purchase, the buyer goes through a checkout process, which may include selecting a payment mechanism. The payment may be processed through a payment provider, such as PayPal, Inc. of San Jose, Calif.

After agreeing to a purchase transaction and as part of the checkout process, the buyer and seller agree on a method of payment at step 104, which would be COD in this case. The seller may offer this method of payment through the payment provider, or the buyer may propose this to the seller. In the former case, the buyer may then simply select a COD payment method during the checkout process with the payment provider. In the latter case, the seller, if he accepts the buyer's proposal, may issue an invoice to the buyer, which the buyer may accept. This may be done through the payment provider. For example, the buyer may receive an electronic invoice from the seller, such as by email. The buyer can then access one or more links from the invoice and be directed to a payment page of the payment provider.

Next, at step 106, the buyer enters payment information. In one embodiment, the buyer enters the information on the payment provider site, such as through the buyer's account with the payment provider. The buyer may enter log in information, such as a user name and password. A funding source may be selected, such as a credit card or a bank account. The payment provider may then process the payment request to authorize or decline. If authorized, the funds are not yet released or transferred to the seller, but instead held in the buyer's account, such as with rules set by the payment provider, until delivery to the buyer is confirmed.

As part of the transaction, the buyer selects an identifier at step 108. The identifier can be a sequence of symbols such as letters, numbers, and/or characters, a word, a phrase, a picture, a video, an audio clip, a sound, any combination or the like. Selection of the identifier may depend in part on the type of identifier. For example, if the identifier is a sequence of letters, numbers, and/or characters, a word, a phrase, or something the buyer can enter through a keyboard or keypad, selection may include asking the user to enter the identifier. The buyer may be asked to re-enter or confirm the identifier if input by the buyer. The buyer may also be asked to enter a different identifier if the initially entered identifier was unacceptable, such as not distinct enough or not enough characters. The identifier may be determined by the payment provider or other third party. For example, the identifier may be the buyer's signature stored with the payment provider, the buyer's driver's license number, or other buyer identification.

If the identifier includes a picture or image, a video, an audio clip, or a sound, the user may be asked to select from a set of options or the buyer may be asked to download a user-selected file or data. The buyer may be presented with the same options each time or with differing sets of options from the payment provider. Alternatively, the buyer may choose to download data, such as a photo or audio file from the buyer's PC or other device, for the identifier. In other embodiments, the buyer may be given or assigned the identifier, which may be a reference number associated with the transaction and provided or generated by the payment provider.

Once selected, the identifier is associated with the transaction. In another embodiment, the identifier could be associated with the buyer. The payment provider stores the identifier, transmits it to a shipping company, and/or transmits it to the seller so that a comparison can be made upon delivery. The purchase is then delivered from the seller to the buyer at step 110, where delivery can be through a shipping company or the seller. For example, the seller may request UPS, FedEx, the postal service, or other service to pick up the purchased item and deliver it to the address indicated in the transaction.

Upon delivery to the buyer, the seller may request the buyer to enter or select a identifier, at step 112, that corresponds to the delivered item. The buyer may first inspect the delivery to make sure the item is what was purchased. For example, the delivered item may be the wrong item, a different model, damaged, etc. If the item is acceptable to the buyer, the buyer may then enter or select an identifier. Entry can be through a keypad, touch pad, or any suitable data entry means, including simply having the user write the identifier on physical media. The buyer may enter the identifier on a buyer device, such as a mobile phone, or on a device of the delivery person.

The buyer may also select from a list or set of identifiers. In this case, the buyer may be presented with a list or set of identifiers from a device of the delivery person. From that list, the buyer may select one of the identifiers, such as an image or other visual and/or audio data representation.

After the identifier is entered or selected by the buyer, a determination is made, at step 114, whether there is a match with the identifier associated with the transaction during purchase. Depending on the mode of entry or selection and the type of identifier, this determination may be made by the delivery person through a visual or audio inspection or transmitted to the seller or delivery company for determination.

In one embodiment, the identifier is entered into either a buyer device or a shipper device. The information is transmitted to the payment provider, who then compares the received identifier with the stored identifier associated with the transaction. If the identifiers match, the payment provider transmits a confirmation to the shipper device and/or the buyer device. If the identifiers do not match, a corresponding message may be transmitted or the buyer may be requested to re-enter the identifier.

In another embodiment, the identifier is selected by the buyer from a shipper device or buyer device. The selection is transmitted to the payment provider and a determination is made by the payment provider, similar to the above.

In yet another embodiment, the delivery or shipping person makes a manual comparison after the buyer enters the identifier. If the identifiers match, the delivery person sends a transmission to the shipping company and/or the seller indicating a proper delivery. If the identifiers do not match, the delivery person may request the buyer to enter or select the identifier again.

If the determination at step 114 is that there is no match, the buyer may be asked to enter or select the identifier again. After a predetermined number of incorrect entries or selections, the buyer may be asked to confirm the transaction in another way, such as contacting the seller and/or payment provider. Alternatively, the shipper may refuse delivery and try to re-deliver at another time.

However, if the buyer enters or selects the identifier corresponding to the one associated with the delivery, the delivery is made and the funds released to the seller at step 116. This can be as soon as the match is determined and at the point of delivery. In one embodiment, after the buyer has entered or selected a correct identifier, funds from the buyer's account are released to the seller. The account with the seller may be with the payment provider or with another financial entity. In another embodiment, the payment provider waits until the shipper and/or buyer has confirmed deliver, such as the shipper or buying clicking on a link or button on a device to transmit a message to the payment provider. Confirmation may also be after the buyer has signed, either electronically or on paper, for the delivery. The seller may be notified electronically that the purchase has been completed and the funds transferred to the seller's account. In transaction not requiring an identifier or shared secret, the delivery person may confirm delivery, such as by knowing the buyer personally or other means, which triggers the release of the funds.

Figure 2:
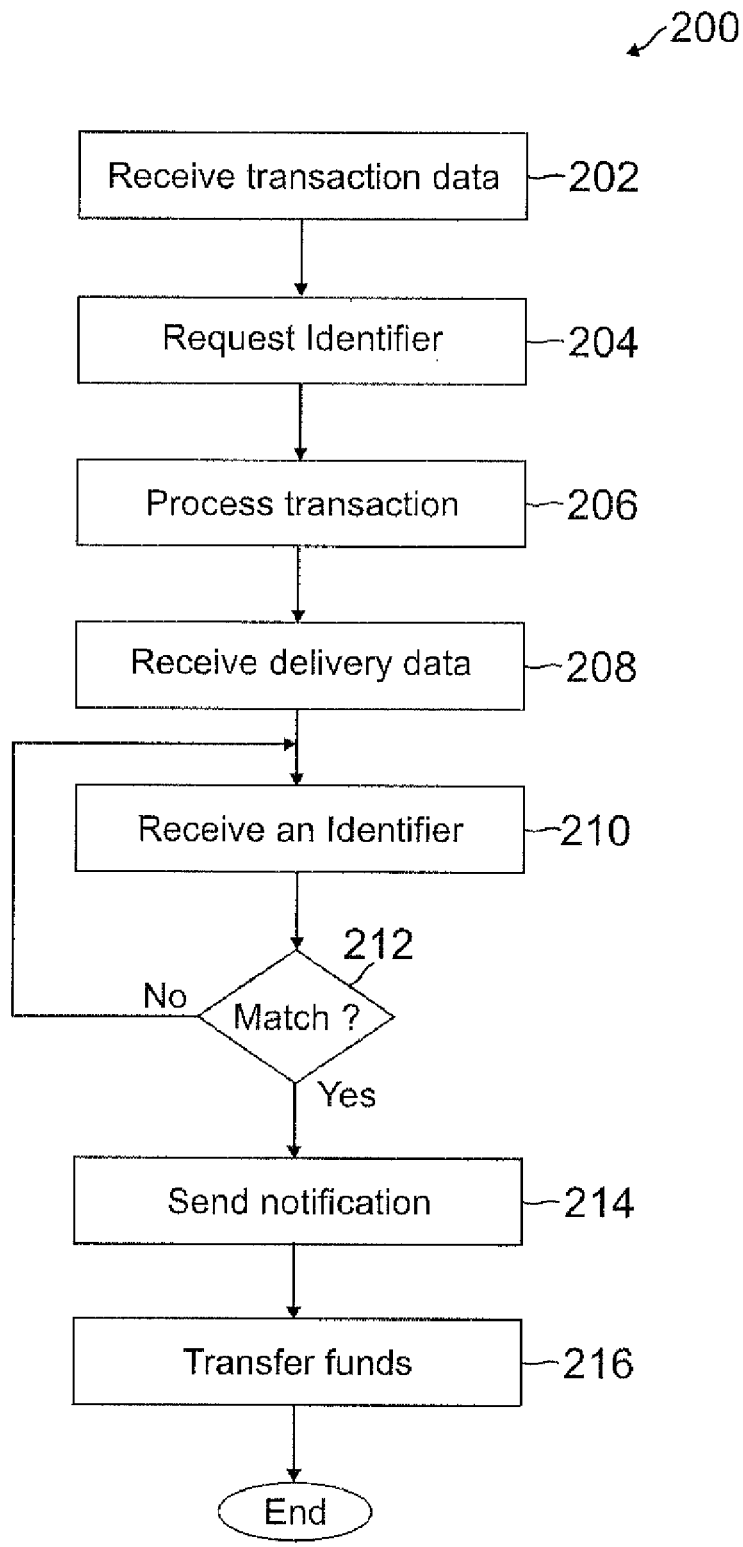
FIG. 2 is a flowchart showing steps performed by a payment provider to facilitate an identifier-based COD transaction according to one embodiment.

FIG. 2 is a flowchart 200 showing steps performed by a payment provider to facilitate an identifier-based COD transaction according to one embodiment. At step 202, the payment provider receives data about a transaction between a buyer and seller. The data may include a reference number for the transaction, information about the purchased items, information about the seller, such as account information, information about the buyer, such as a funding source or account information, amount of the purchase, and terms of the purchase, i.e., whether it will be a COD transaction. Such information may be conveyed electronically through one or more computing devices, e.g., a mobile phone or PC. The information conveyed is typical of an on-line transaction with a payment provider, with the exception of possibly the COD transaction.

When the payment provider receives an indication that the purchase will be on COD terms, the payment provider may ask the buyer to enter or select an identifier at step 204. As discussed above, this may involve the buyer entering information into a buyer device or the buyer selecting a identifier from a set of options presented to the buyer, where the information is transmitted to and received by the payment provider. The payment provider may assign an identifier to the buyer, such as a tracking or reference number. If the parties agree, there may not need to be an identifier.

Next, at step 206, the payment provider processes the transaction, which may include associating the transaction data with the received identifier. Processing may also include determining whether the buyer has sufficient funds to make the purchase, whether the transaction should be approved, whether the buyer has entered correct information associating the buyer with a proper account, etc. If the transaction is approved, the payment provider may notify both parties accordingly, but not yet release the funds to the seller.

At this point, the seller arranges delivery of the purchase to the buyer. When delivery is about to be made, i.e., when the delivery person arrives at the delivery location, the delivery person transmits delivery data, which is received by the payment provider at step 208. This may include the delivery person entering and transmitting information from a mobile computing device of the delivery person, where the information may include a reference or tracking number of the delivery or other data that identifies the transaction. Note that when the seller arranges delivery, the seller may send a tracking number to the payment provider so that the payment provider can associate the tracking number with the earlier transaction.

After the payment provider is notified that delivery is ready, it receives an identifier entered or selected by the buyer or recipient at step 210. Next, at step 212, the payment provider determines whether the received identifier matches the shared secret from step 204. In one embodiment, the payment provider retrieves information about the transaction from delivery data received at step 208. Included in the information is the identifier, which the payment provider compares with the one received from the buyer at the point of delivery. If there is a match, this indicates that the delivery is to the proper recipient or buyer. In other embodiments, different ways may be used to confirm a proper delivery, such as personal knowledge of the buyer by the delivery person or company. This may be then conveyed to the payment provider.

If there is not a match, the payment provider cannot confirm proper delivery and may request and receive another entry or selection by the buyer. If no match is received after a certain amount of attempts, the payment provider may request another faun of confirmation or may cancel the delivery and attempt delivery and confirmation another time. An improper identifier may indicate that the buyer is not the intended recipient, which may be due to an error of the shipper or shipping address. It may also be due to a fraudster attempting to pick up a package at the real buyer's location. Thus, confirming an identifier, which only the proper buyer and anyone else the proper buyer informs, enables the payment provider to ensure delivery to the intended recipient.

So, if a proper match is determined at step 212 (or by another indication of a proper delivery), the payment provider may send a notification, at step 214, to the buyer, seller, and/or the shipping person that the delivery can be made. Notification to the shipping person enables the shipping person to delivery the purchase to the buyer, confident that the buyer is the correct recipient. Notification to the buyer and/or seller informs them that a payment was made and that funds will be or are released. The funds are then released to the seller's account at step 216.

Figure 3:
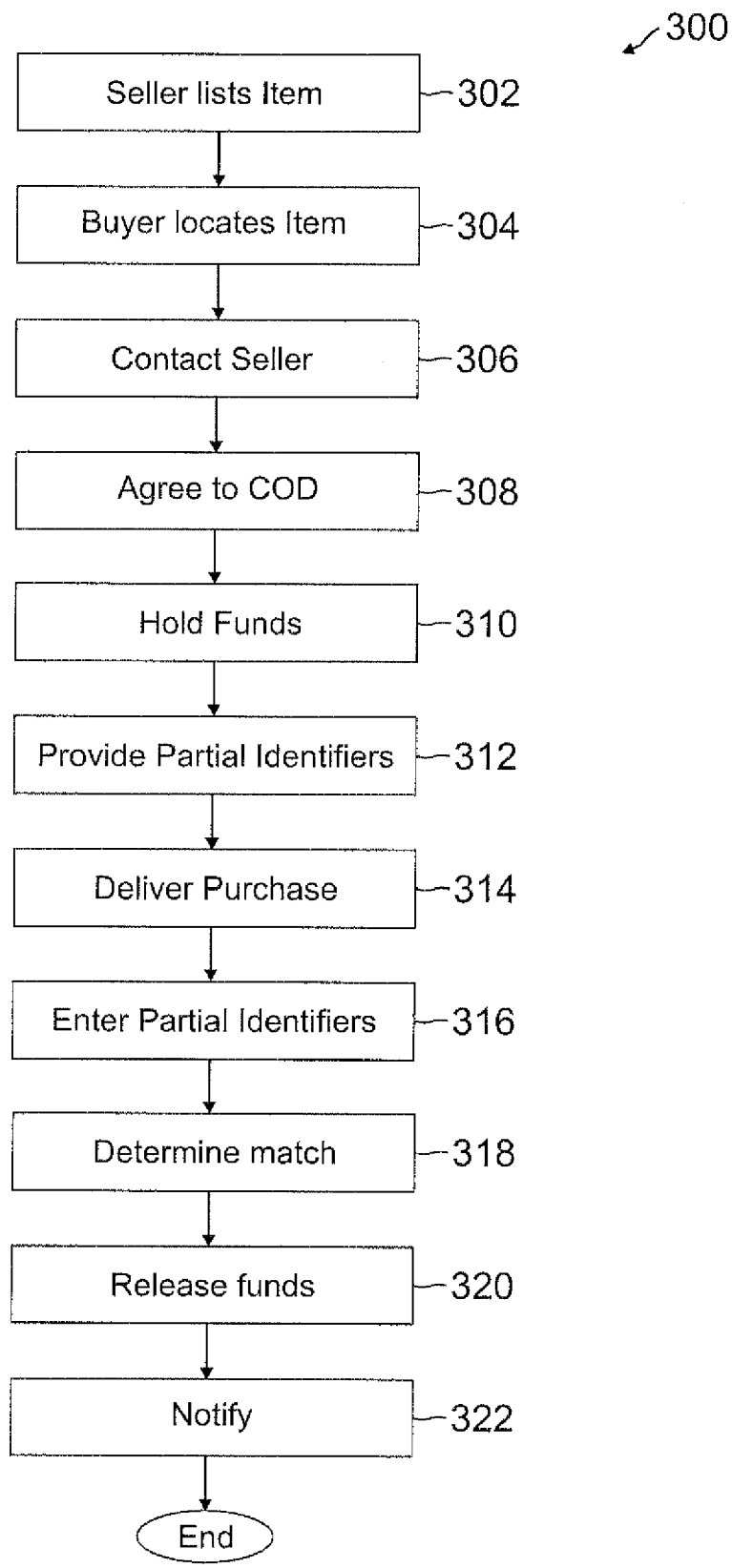
FIG. 3 is a flowchart showing steps used to facilitate an identifier-based COD transaction according to one embodiment.

FIG. 3 is a flowchart 300 showing another embodiment of steps used to facilitate an identifier-based COD transaction. In this embodiment, the seller delivers the purchase to the buyer, such as in a transaction involving an on-line classified ads site like Craigslist or Kijiji. At step 302, a seller lists an item for sale on an on-line site, such as eBay, Craigslist, or Kijiji. Next, the consumer or buyer locates a product or service, at step 304, that the buyer may be interested in purchasing. In one example, the buyer may search the Internet for a particular item or browse a site to see if there is anything of interest. In the former situation, the may be presented with numerous sellers, which the buyer can narrow down to a few selected sellers for follow up. In the latter situation, the buyer may access a classified ads site such as Craigslist or Kijiji, which have basic listings of goods and services organized in different categories.

Once an item is located, the buyer contacts the seller in step 306. The buyer may contact the seller by any suitable means, including online, e-mail, texting, phone call, facsimile, etc., and convey that the buyer is interested in the product or service, but would require more information than what is currently provided. Contact may also be through a payment provider. The buyer and seller then agree to a COD-method of payment at step 308. Next, at step 310, the buyer places funds for the transaction in a holding account or the same account, but not yet released. This can be through a buyer device, such as a desk top computer, a laptop computer, a mobile phone, a PDA, or other computing device, through wired or wireless communication networks. If the buyer does not have an account with this particular provider, the buyer can easily create an account by entering requested information, such as e-mail, user name, and/or a password. The buyer can also choose to fund a temporary account, such as managed by a payment provider, by going to a physical location and putting money towards the transaction in an account that they may not have access to online (or through mobile), but that accomplishes the same purpose of pending for the shipment to arrive. If the buyer already has an account, the buyer accesses the account by logging into the account, such as simply entering in an e-mail address or user name and a password.

The buyer can enter the amount of money to be held, along with the funding source of the money. For example, the buyer may simply enter a specific amount from a touchpad or keyboard of the buyer device, the buyer may select from a series of buttons having different set amounts (e.g., $10, $20, $30, etc.), or the payment may be provided such that the buyer simply has to confirm the amount. In naming a funding source, the source may be an account with the payment provider or an outside financial institution, such as a bank or credit card. The funding source can be specified by entering an account number, such as a credit card number or bank account number, or selecting from one or more pre-set sources, which may already have all the needed relevant information. In that case, a simple press of a button may be sufficient to select the funding source.

In addition to specifying an amount and funding source, the buyer may also designate a recipient of the funds (e.g., the seller) if they are released. This information may include an account number, account name, a device phone number, email, or any other suitable information. The recipient or seller does not need to have an account with the payment provider; however, in that case, the payment provider should have the capability of receiving or sending funds to another financial institution, such as a bank. If the payment provider has contact information about the seller, the payment provider may notify the seller that funds have been held for the seller. The buyer may also be notified that funds have been committed and held. Notification can be by e-mail, SMS, or any other suitable form of communication. Depending on the form of notification, the notification can be received on a mobile phone, FDA, or computer.

If the payment provider authorizes the purchase, e.g., that the buyer has sufficient funds in buyer's account, the buyer and seller are provided portions of an identifier for the transaction at step 312, such as by the payment provider. This identifier can be of the type discussed in FIGS. 1 and 2, such that the buyer receives one part of the identifier and the seller receives the remaining part. For example, the buyer may receive a first half sequence of letters, characters, and/or numbers and the seller may receive the last half sequence, or the buyer may receive a first image and the seller may receive a second image, where the identifier is a sequence of the two images. In other embodiments, the buyer and/or the seller may select the identifier or portions themselves.

Next, at step 314, the seller delivers the purchase to the buyer. Upon delivery, the buyer and seller enter or select their respective portions of the identifier at step 316, assuming both the buyer and seller are satisfied when the delivery is made. Entry can be through their individual devices, where the information is then transmitted to the payment provider. Entry can also be through a single device, such as the seller's device, the buyer's device, or another device.

A determination is then made at step 318 whether the combination of the two portions match the total identifier associated with the purchase. This can be determined by the payment provider. In other embodiments, this can be determined by the buyer and seller themselves in the case where both the buyer and seller know the identifier.

If there is a match, the held funds can be immediately released to the seller at step 320. Again, this can be effected through the payment provider after the payment provider determines there is a match. In another embodiment, the buyer and/or seller may transmit a confirming message to the payment provider, so that the payment provider releases the funds to the seller when the confirming messages are received. If there is no match, the parties may be asked to re-enter their portions of the identifier.

After funds are transferred or released, the payment provider may send, such as through SMS, a confirmation to the seller's mobile device that the requested funds have been released and deposited into the seller's account, at step 322. The payment provider may also send the same or similar confirmation to the buyer's mobile device. Note that the either confirmation can be sent in any manner to any device and is not limited to mobile devices of the buyer or seller.

Figure 4:
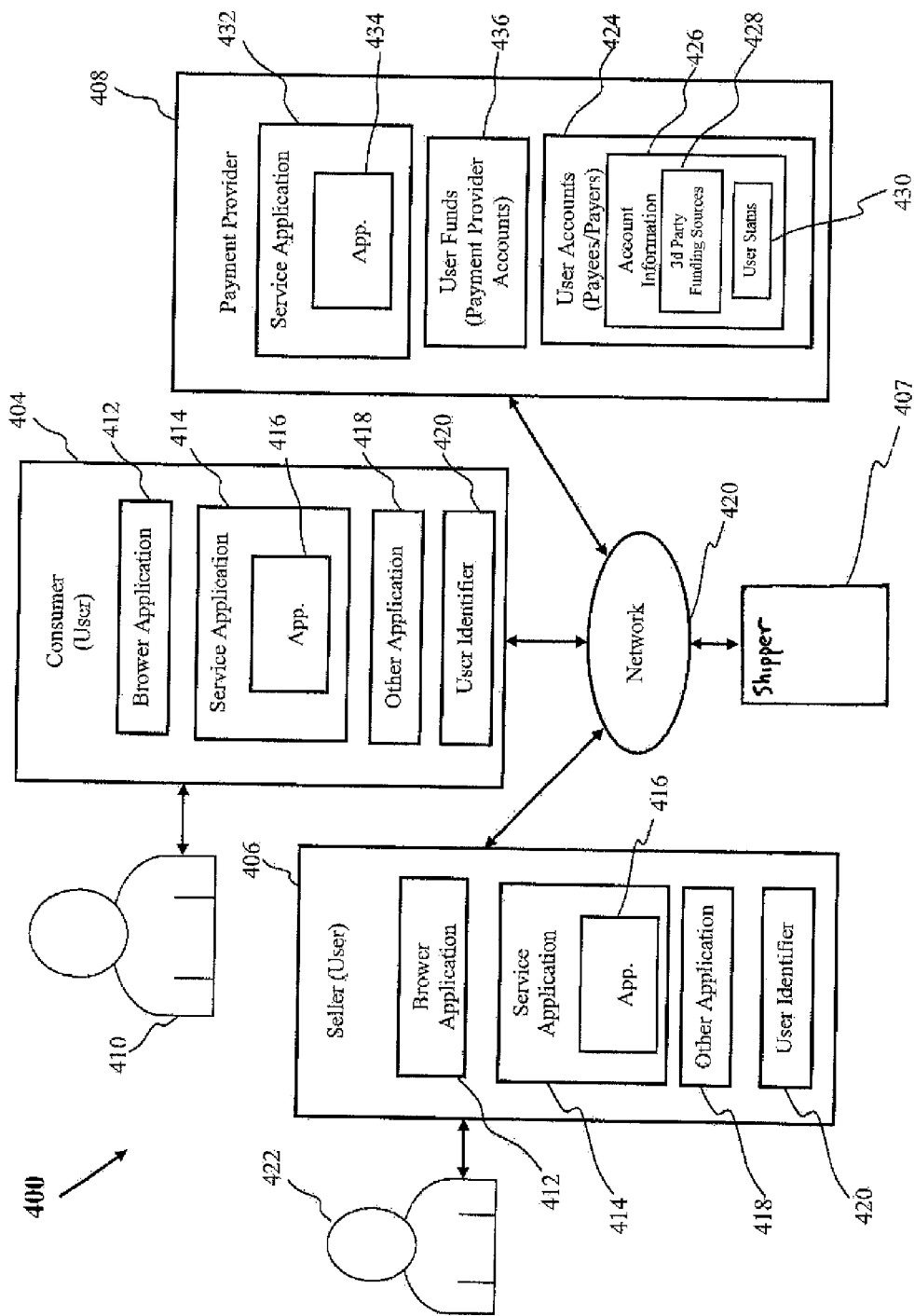
FIG. 4 is a block diagram of a networked system used in a identifier-based COD transaction according to one embodiment.

FIG. 4 shows one embodiment of a block diagram of a networked system 400 configured to facilitate financial transactions over a network 402 to perform the steps described above with respect to FIGS. 1 and 2. System 400 includes at least one consumer device 404, one seller device 406, one shipper device 407, and at least one payment provider server 408 in communication over network 402. In one embodiment, the shipper device and the seller device may be the same device, such as when the seller is also the shipper described in FIG. 3. In one embodiment, network 402 may be implemented as a single network or a combination of multiple networks. For example, network 402 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

In one embodiment, consumer device 404 may be implemented using any appropriate combination of hardware and/or software configured for wired and/or wireless communication over network 402. For example, consumer device 404 may be implemented as a personal computer of a buyer/consumer/user 410 in communication with network 402, a wireless telephone (e.g., smart phone), personal digital assistant (PDA), notebook computer, and/or various other generally known types of computing devices. Consumer device 404 may include one or more browser applications 412 which may be used, for example, to provide a user interface to permit the buyer 410 to browse information available over network 402. For example, browser application 412 may be implemented as a web browser to view information available over the Internet.

Consumer device 404 may also include a service application 414 for facilitating financial transactions on network 402. The service application may include a COD application 416 which may support or facilitate agreeing to use funds for a purchase and for the funds to be released when delivery is confirmed, as discussed above. In an example embodiment, the service application 414 comprises a software program or programs, such as a graphical user interface (GUI), executable by a processor that is configured to interface and communicate with a seller 422 via network 402 and seller device 406 and with payment provider server 408 via network 402. In an example embodiment, the service application may be resident on the consumer device or accessed by a buyer through network 402. Buyer 410 may initiate or agree to a COD transaction with seller 422 through the devices. The seller may respond to the buyer, and the payment provider server may facilitate the transaction, record the transaction, and execute the transaction as appropriate. Service application 414 may also enable the buyer to communicate with payment provider 408, a seller, and/or a shipper via network 402 to enter, select, or communicate a partial or complete identifier, as discussed above with respect to FIGS. 1-3.

In an example embodiment, service application 414 and COD application 416 may be accessed using a protocol such as a WSDL (web services definitional language), SOAP (simple object access protocol), API (application program interface), or the like. The applications may be initiated from a remote call procedure from an API or other protocol. The remote calls may be initiated from a program resident on the consumer's device, for example, a financial software program such as QUICKEN, QUICKBOOKS, INTUIT, SAP or from a third-party platform or website, for example a social networking site such as Facebook, MySpace, Twitter, or any other website that may feature access to a payment provider service application or COD application When installed on or accessed by consumer device 404 and run from consumer device 404, service application 414 is configured to provide and display payment services mechanism or mechanisms, such as an image, icon, radio button, dialogue box or other graphical user interface (GUI) on a display component (e.g., monitor or screen) of consumer device 404. In general, the GUI represents a program, application, command, link to a web page, etc., wherein buyer 410 may select a payment service, shop, conduct other payment processing services. The GUI may include a the option of initiating a COD transaction by taking a certain action, for example by clicking on a related icon, radio button, link or other button or representation using a cursor control component (e.g., mouse) or keyboard.

In an example embodiment, in which buyer 410 has not yet established an account or user record with payment provider server 408, upon installation of service application 414, buyer 410 may be prompted to establish a user account with payment provider server 408, wherein buyer 410 may use consumer device 404 to access payment provider server 408 via network 402. When establishing a user account, buyer 410 may be asked to provide personal information, such as name, address, phone number, user name, e-mail address, password, etc., and financial information, such as banking information, credit card information, etc.

Payment provider server 408 may create a user account 424 for each user or buyer 410. The user account may include account information 426, including third party funding source information 428 used to fund a seller account, and a user status 430. Third-party funding source information 428 may include the identity of sources, routing numbers, account numbers and the like. Information related to the availability of funds and/or credit may be stored as part of a user status.

Consumer device 404 may include other applications 418 as may be desired in particular embodiments to provide additional features available to buyer 410. For example, such other applications 418 may include security applications for implementing consumer-side security features, programmatic user applications for interfacing with an appropriate protocol such as WSDL, SOAP or API or the like over network 402 or various other types of generally known programs and/or applications.

Consumer device 404 may also include one or more user identifiers 420, which may be implemented, for example, as operating system registry entries, cookies associated with browser application 412, identifiers associated with hardware of the consumer device 404, or various other appropriate identifiers. User identifier 420 may include attributes related to the user, such as personal information (e.g., a user name, password, photograph image, biometric ID, address, phone number, etc.) and banking information (e.g., banking institution, credit card issuer, user account numbers, security information, etc.). In various implementations, user identifier 420 may be passed with a request to transfer funds to payment provider server 408, and user identifier 420 may be used by payment provider server 408 to associate buyer 410 with a particular user account 424 maintained by payment provider server 408.

In one embodiment, seller device 406 may be similar to consumer device 404. It may be owned, operated, maintained or have applications managed, for example, by a financial or payment services provider with user account 424 stored on payment provider server 408. Seller device 406, browser application 412, service application 414, COD application 416, other applications 418, and user identifier 420 may implemented similarly as described above with respect to the consumer device. Service application 414 of seller device 406 may also enable the seller to post a listing of an item for sale on an on-line site through network 402.

Payment provider server 408 may be maintained, for example, by an online payment service provider, such as PayPal, Inc. of San Jose, Calif., which may provide payment processing for online transactions on behalf of buyer 410 to seller 422 through their respective devices 404 and 406. Payment provider server 408 may include one or more service applications 432, which may be configured to interact with devices 404, 406 over network 402 to facilitate the financial transactions (including COD transactions), purchase of items, products and/or services from other users or from third-party merchants (not shown).

Payment provider server 408 may be configured to maintain a plurality of user (buyers and sellers) accounts 424, each of which may include account information 426 associated with individual users, including buyer 410 and seller 422 associated with devices 404, 406, respectively. For example, account information 426 may include information, such as one or more account numbers, passwords, credit card information, banking information, user name, or other types of financial information, which may be used to facilitate online transactions between buyer 410 and seller 422. User accounts 424 may include memory in individual seller accounts that stores identifiers from the buyer.

User funds accounts 436 may be maintained by payment provider server 408, which represent funds that are held by the payment provider. The funds in the account may represent funds received in previous transactions and/or funds placed in the account by a user for access through the payment provider services and/or funds returned to a user by a merchant upon a return of an item or cancellation of a service. Funds deposited and held in accounts may also be maintained in user funds accounts, where funds are not released or transferred until delivery has been confirmed or until a certain amount of time has expired, with both parties agreeing to that time. A modification to this "time to expire" may be by mutual agreement or by the shipping provider to account for extra delays caused by acts of God or other uncontrollable events.

Confirmation can be through shipper device 407, which may be similar to devices 404 and 406. As discussed above, a complete identifier may be entered in or selected from shipper device 407, such as by the buyer or shipper, and transmitted to the payment provider for determination or determination can be made directly through shipper device 407. In the former case, shipper device 407 can transmit the identifier to the payment provider for determination.

Figure 5:
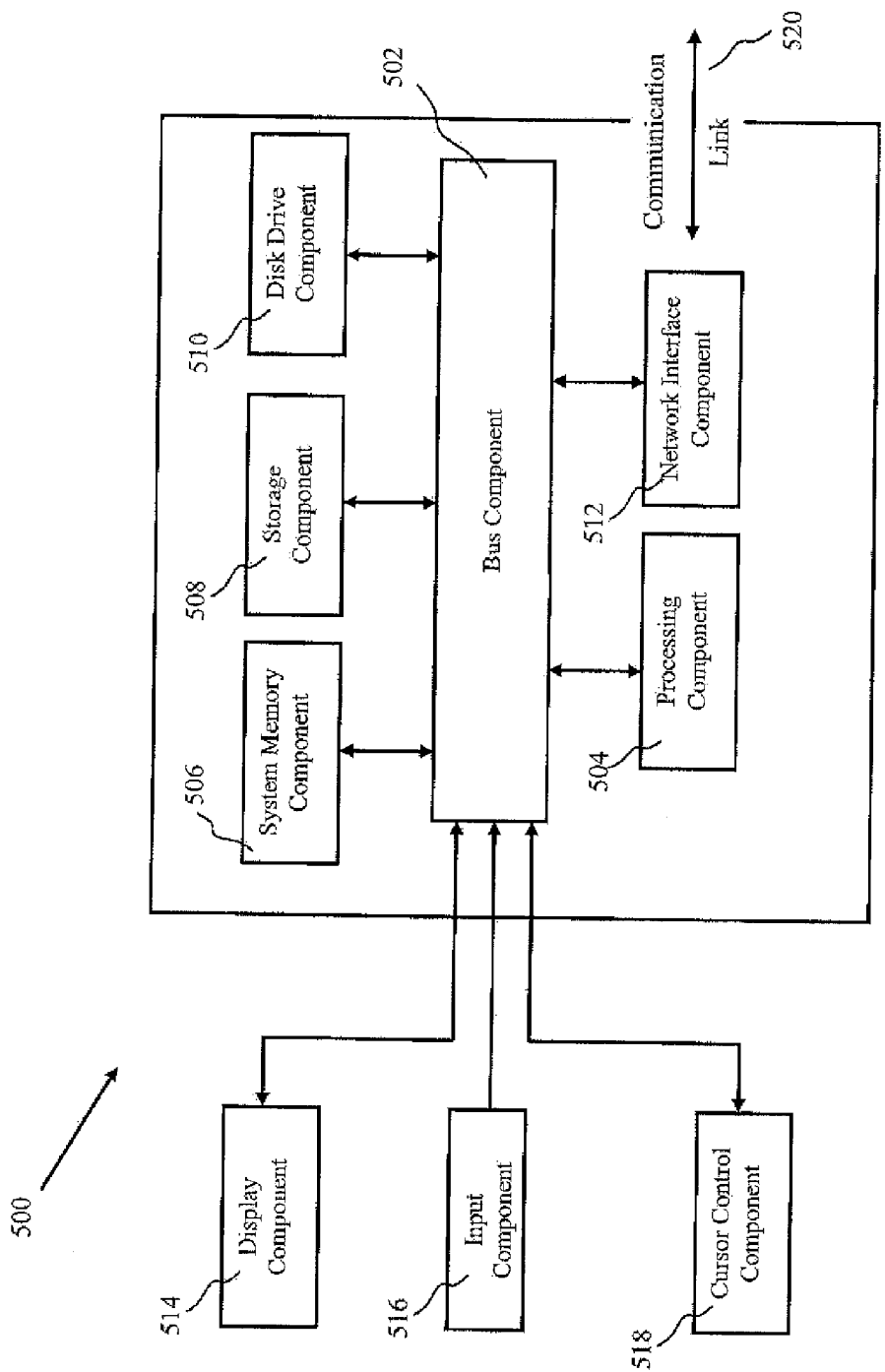
FIG. 5 is a block diagram of one embodiment of a system that can be used to implement one or more components of the system in FIG. 4.

FIG. 5 is a block diagram of a computer system 500 according to one embodiment, which may be suitable for implementing embodiments of various aspects of this disclosure, including, for example, devices 404, 406, 407, and/or payment provider server 408. In various implementations of various embodiments, devices 404, 406, and/or 407 may comprise a personal computing device, such as a personal computer, laptop, PDA, cellular phone or other personal computing or communications devices. Payment provider server 408 may comprise a network computing device, such as one or more servers, computer or processor combined to provide the payment services. Thus, it should be appreciated that devices 404, 406, 407, and/or payment provider server 408 may be implemented as computer system 500 in a manner as follows.

In one embodiment, computer system 500 may include a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 516 (e.g., keyboard or keypad), and/or a cursor control component 518 (e.g., mouse or trackball). In one embodiment, disk drive component 510 may comprise a database having one or more disk drive components.

Computer system 500 may perform specific operations by processor 504 executing one or more sequences of one or more instructions contained in system memory component 506, according to steps described above with respect to FIGS. 1-3. Such instructions may be read into system memory component 506 from another computer readable medium, such as static storage component 508 or disk drive component 510. The various storage or memory components may be used to store transaction/buyer identifiers as discussed above. In other embodiments, hard-wired circuitry may be used in place of or in combination with software instructions to implement the invention.

Logic may be encoded in a computer readable medium, which may refer to any medium that participates in providing instructions to processor 504 for execution. Such a medium may take many folios, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartidge, carrier wave, or any other medium from which a computer is adapted to read.

In various example embodiments, execution of instruction sequences for practicing embodiments of the invention may be performed by computer system 500. In various other embodiments, a plurality of computer systems 500 coupled by communication link 520 (e.g., network 402 of FIG. 4, LAN, WLAN, PTSN, or various other wired or wireless networks) may perform instruction sequences to practice the invention in coordination with one another.

Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. For example, the description above focused on a payment provider handling the payment between the buyer and seller. However, it may also be suitable for the seller to generate an invoice to the buyer, the buyer to agree to terms, and the seller or payment provider then processing the shared secret, such that the seller is taking additional actions. Thus, the invention is limited only by the claims.

What is claimed is:

1. A system comprising:
   a memory storing information about user accounts, wherein the information comprises at least one identifier associated with at least one transaction between a buyer and a seller; and
   one or more processors configured for
      receiving purchase data for the transaction from a marketplace;
      generating an identifier associated with the transaction and providing a first partial identifier to a buyer and a second partial identifier to a seller, wherein the identifier associated with the transaction comprises the first and second partial identifiers;
      determining the buyer has committed funds for the transaction, wherein the funds are held pending resolution of the transaction;
      receiving the first partial identifier from the buyer;
      receiving the second partial identifier from the seller;
      comparing the received first partial identifier and the received second partial identifier with the generated identifier associated with the transaction; and
      releasing funds held from an account of the buyer to an account of the seller when the comparing results in a positive match between the generated identifier associated with the transaction and the received first and second partial identifiers.

2. The system of claim 1, wherein the transaction is for a purchase of digital goods.

3. The system of claim 1, wherein the first and second partial identifiers are provided at the time of the transaction.

4. The system of claim 1, wherein the identifier comprises an audio or text message, a sequence of symbols, letters, numbers, and/or characters, a phrase, an image, or a combination thereof.

5. The system of claim 1, wherein the first partial identifier is received from a third party delivery device.

6. The system of claim 1, wherein the second partial identifier is sent by the seller after delivery.

7. The system of claim 1, wherein the first partial identifier is received from a buyer device after the buyer receives delivery of one or more items purchased in the transaction.

8. A non-transitory computer-readable medium containing instructions that cause a purchase provider facilitating purchase transactions over a network to perform a method comprising:
   receiving purchase data for the purchase transaction from a marketplace;
   generating an identifier associated with the purchase transaction and providing a first partial identifier to a buyer and a second partial identifier to a seller, wherein the identifier associated with the purchase transaction comprises the first and second partial identifiers;

determining the buyer has committed funds for the transaction, wherein the funds are held pending resolution of the transaction;

receiving the first partial identifier from the buyer;

receiving the second partial identifier from the seller;

comparing the received first partial identifier and the received second partial identifier with the generated identifier associated with the transaction; and releasing funds held from an account of the buyer to an account of the seller when the comparing results in a positive match between the generated identifier associated with the purchase transaction and the received first and second partial identifiers.

9. The non-transitory computer-readable medium of claim 8, wherein the purchase transaction is for a purchase of digital goods.

10. The non-transitory computer-readable medium of claim 8, wherein the first partial identifier is selected or entered by the buyer at the time of the purchase transaction.

11. The non-transitory computer-readable medium of claim 8, wherein the identifier comprises an audio or text message, a sequence of symbols, letters, numbers, and/or characters, a phrase, an image, or a combination thereof.

12. The non-transitory computer-readable medium of claim 8, wherein the first partial identifier is known to the buyer and a payment provider holding the funds.

13. The non-transitory computer-readable medium of claim 8, wherein the first partial identifier is communicated by the buyer after receiving one or more items from the purchase transaction.

14. A method comprising:

receiving, at the payment provider, purchase data for the transaction from a marketplace;

generating, by a processor of the payment provider, an identifier associated with the transaction and providing a first partial identifier to a buyer and a second partial identifier to a seller, wherein the identifier associated with the transaction comprises the first and second partial identifiers;

determining the buyer has committed funds for the transaction, wherein the funds are held pending resolution of the transaction;

receiving the first partial identifier from the buyer;

receiving the second partial identifier from the seller;

comparing the received first partial identifier and the received second partial identifier with the generated identifier associated with the transaction; and releasing funds held from an account of the buyer to an account of the seller when the comparing results in a positive match between the generated identifier associated with the transaction and the received first and second partial identifiers.

15. The method of claim 14, wherein the transaction is for a purchase of digital goods.

16. The method of claim 14, wherein the first partial identifier is selected or entered by the buyer at the time of the transaction.

17. The method of claim 14, wherein the identifier comprises an audio or text message, a sequence of symbols, letters, numbers, and/or characters, a phrase, an image, or a combination thereof.

18. The method of claim 14, wherein the first partial identifier is known to the buyer and a payment provider holding the funds.

19. The method of claim 14, wherein the first partial identifier is received from a third party delivery device.

20. The method of claim 14, wherein the second partial identifier is sent by the seller after delivery.

21. The method of claim 14, wherein the first partial identifier is received from a buyer device after the buyer receives delivery of one or more items purchased in the transaction.

* * * * *

UNITED STATES PATENT AND TRADEMARK OFFICE
CERTIFICATE OF CORRECTION

PATENT NO. : 8,392,275 B2  Page 1 of 1
APPLICATION NO. : 13/551398
DATED : March 5, 2013
INVENTOR(S) : German Scipioni It is certified that error appears in the above-identified patent and that said Letters Patent is hereby corrected as shown below:

In the Specification

In column 7, line 46, change the word "faun" to --form--.

In column 9, line 3, change the word "FDA" to --PDA--.

In column 13, line 24, change the word "cartidge" to --cartridge--.

Signed and Sealed this
Fifteenth Day of July, 2014

Michelle K. Lee
*Deputy Director of the United States Patent and Trademark Office*